United States Patent [19]

Hunt et al.

[11] 4,281,111

[45] Jul. 28, 1981

[54] COLD WATER HYDRATING STARCH

[75] Inventors: Walter G. Hunt, Bridgeton, Mo.; Leslie P. Kovats, Granite City, Ill.; Edward M. Bovier, St. Louis County, Mo.

[73] Assignee: Anheuser-Busch, Incorporated, St. Louis, Mo.

[21] Appl. No.: 87,827

[22] Filed: Oct. 25, 1979

Related U.S. Application Data

[63] Continuation-in-part of Ser. No. 919,961, Jun. 28, 1978, abandoned.

[51] Int. Cl.$^3$ .............................................. C08G 59/40
[52] U.S. Cl. ................................... 536/111; 426/565; 426/578; 426/579; 426/661; 536/105; 536/106
[58] Field of Search ............... 426/565, 578, 579, 661; 536/105, 106, 111

[56] References Cited

U.S. PATENT DOCUMENTS

| | | | |
|---|---|---|---|
| 2,732,309 | 1/1956 | Kerr | 536/108 |
| 3,176,007 | 3/1965 | Tuschhoff | 536/111 |
| 3,705,891 | 12/1972 | Tuschhoff et al. | 536/106 |
| 3,725,386 | 4/1973 | Hanson et al. | 536/111 |

OTHER PUBLICATIONS

Whistler et al., Starch: Chemistry and Technology, vol. 1, Academic Press, N. Y., 1965, pp. 474–478.

*Primary Examiner*—Melvyn I. Marquis
*Attorney, Agent, or Firm*—Gravely, Lieder & Woodruff

[57] ABSTRACT

This invention relates to a process for preparing cold water hydrating starch which, when hydrated in water, produces a short creamy textured paste, especially useful in instant pudding formulations. These properties are attained without the use of the classical types of polyfunctional crosslinking reagents such as epichlorohydrin, phosphorus oxychloride, acrolein, etc. This process comprises treating starch with from 0.1% to 1% chlorine (preferably 0.4–0.6%) as sodium hypochlorite to inhibit the starch, but not to degrade or depolymerize it, and then reacting the inhibited starch with an alkylene oxide to produce a hydroxypropyl starch having a degree of substitution of about 15.5% to about 18.5%.

16 Claims, No Drawings

COLD WATER HYDRATING STARCH

REFERENCE TO PRIOR APPLICATIONS

This application is a continuation-in-part of prior copending application of Hunt, Kovats and Bovier, Ser. No. 919,961 filed June 28, 1978 entitled Cold Water Hydrating Starch and now abandoned.

BACKGROUND OF THE INVENTION

This invention relates to cold water swelling hydroxypropylated starches which are suitable for use in food products.

Kesler et al U.S. Pat. No. 2,516,634 discloses a method of preparing cold water swelling starch ethers by directly reacting an alkylene oxide (propylene oxide) with ordinary commercial starches containing about 10% by weight of moisture and a small amount of salt or soluble alkali, or both, incorporated in the granules. It is extremely difficult and impractical to remove the off-taste and odors from hydroxypropyl starch ethers made according to this process.

Kesler et al U.S. Pat. No. 2,845,417 discloses a method of preparing cold water gelatinizing hydroxyalkyl derivatives of unswollen granule starches and dextrins by mixing an aqueous starch slurry with a completely water-miscible alcohol and an alcohol-soluble alkali, and then reacting the starch material with a hydroxy-alkylating agent. The hydroxyalkylating agent is preferably ethylene oxide or ethylene chlorohydrin. Excess sodium chloride and sodium hydroxide impart an undesirable taste to the starch derivative.

Hanson et al U.S. Pat. No. 3,785,386 discloses a process of purifying the products derived from Kesler U.S. Pat. No. 2,516,634 and Kesler U.S. Pat. No. 2,845,417 by washing the crude reacted products with a water-alcohol mixture; the water in this mixture is present in a weight ratio of between 0.1 to 0.7 parts per part of alcohol.

Tuschhoff U.S. Pat. No. 3,705,891 discloses a method for producing ungelatinized starch derivatives suitable for human consumption by reacting propylene oxide directly with dry granular starch in the presence of a catalytic salt such as disodium or trisodium phosphate. These salts do not adversely affect the taste characteristics of the reaction product.

Kerr U.S. Pat. No. 2,733,238 discloses a process for preparing starch derivatives by treating dry starch with a volatile etherifying agent in the presence of catalytic amounts of a quaternary base, or a tertiary amine capable of forming a quaternary base by reacting with the etherifying agent. Etherifying agents contemplated by Kerr include epoxyalkanes and substituted epoxyalkanes such as ethylene oxide, propylene oxide, epichlorohydrin, etc.

It is an object of the present invention to develop a cold water swelling starch that is free of undesirable odors or off-taste.

It is a further object to develop a process for preparing cold water swelling starch that does not result in a chlorohydrin residue.

Another principal object of this invention is to prepare a cold water hydrating hydroxypropyl starch by first treating the starch with a mild chlorine treatment so as to inhibit the starch granule and thus decrease its solubility and increase its viscosity and subsequently reacting the so treated starch with propylene oxide. The mechanism of this starch inhibition is not precisely known, however it is thought that the chlorine treatment reinforces the bonding forces holding the starch granule intact, thereby inhibiting or reducing the degree of granule fragmentation on hydration. Hydrated non-fragmented starch granules bind more water, resulting in thicker sols or pastes which are thicker than sols or pastes made from hydrated fragmented starch granules. The sols or pastes of hydrated non-fragmented starch granules are characterized by short creamy textures.

These and other objects and advantages will become apparent hereinafter.

SUMMARY OF THE INVENTION

This invention involves a process for preparing cold water hydrating starches without epichlorohydrin crosslinking. The process comprises treating starch with sodium hypochlorite or chlorine under mild conditions to produce an inhibited rather than a degraded or depolymerized starch, and then reacting the inhibited starch with propylene oxide. The resulting cold water hydrating starch is useful in formulating a variety of products, especially food products such as instant puddings. When used in instant pudding products, the starch has a short creamy texture.

DETAILED DESCRIPTION

The starch derivative to be prepared by the process of the present invention is a cold water hydrating starch derivative.

Starches suitable for preparing the cold water hydrating starch product may be derived from tapioca, corn, high amylose, sweet potato, potato, waxy maize, canna, arrowroot, sorghum, waxy sorghum, waxy rice, sago, rice, etc. A preferred source of the starch is dent corn starch.

A starch slurry, preferably of unmodified starch, is prepared by mixing one part starch with one to three parts water. The pH of the starch slurry is adjusted to about 2.9 to about 3.0 with dilute hydrochloric acid.

A source of chlorine, preferably sodium hypochlorite containing 8% active chlorine, is added to the starch slurry. The concentration of chlorine as sodium hypochlorite is 0.1% to 1.0% based on the weight of starch.

The degree of starch granule inhibition with chlorine treatment must be carefully controlled; if the granule is not sufficiently inhibited it will fragment on hydration, the sol is of less viscosity and loses its short creamy texture. If the degree of inhibition is too great, the granule will not hydrate to produce the desired viscosity.

The preferred concentration of chlorine as sodium hypochlorite is 0.4–0.6% as shown by the Brabender viscosity (Br) data in Tables I and II. The pH is readjusted to about 3.0 after the addition of sodium hypochlorite. It is preferred to conduct the addition of sodium hypochlorite at a temperature of about 95° F. to about 105° F. at a pH of about 3.0. At this temperature the reaction will require about 3 to about 3½ hours.

After completion of the reaction, the starch slurry is treated with sodium bisulfite to inactivate the unreacted sodium hypochlorite in the slurry. After the unreacted sodium hypochlorite has been inactivated, the slurry is neutralized with a 2% aqueous sodium hydroxide solution or equivalent. The slurry is then diluted with two volumes of water and filtered. The filter cake is resuspended in water and filtered again. The thus washed starch derivative is dried in an air oven.

The chlorine treated starch is inhibited rather than being depolymerized or degraded as are the starches of the prior art when treated with chlorine or sodium hypochlorite. The process of the present invention results in the solubility of the starch being decreased by the hypochlorite or chlorine oxidation step rather than being increased, as would normally be expected from a relatively heavy chlorine treatment. The oxidation step does not bring about degradation of the starch molecule, but does, however, result in mild inhibiting of the starch.

The ultimate result of the foregoing distinction is a significant difference in the character of the dispersion in cold water. The dispersion disclosed in Kerr U.S. Pat. No. 2,732,309 is a fine colloidal dispersion which closely resembles a true solution. The dispersion resulting from the starch product in the present invention can best be described as a suspension. The average size of the suspended particles in Kerr differs from the size of the particles yielded by the present invention.

In the processes of the present invention, the chlorine or hypochlorite is carefully controlled so that degradation will not occur. The modification resulting from the chlorine treatment results in inhibition, but the viscosity is not lowered appreciably. We have succeeded in increasing the viscosity without breaking up the starch granules. If there is too much chlorine treatment, there is an actual decrease in viscosity of the resulting starch in water.

"Inhibition" is distinguishable from "degradation" in that degradation results in solubilizing the starch, whereas inhibition results in a mild crosslinking or an actual decrease in the solubility of the starch product.

Table I shows lower viscosities of 0% chlorine addition and at 0.7% chlorine. The maximum viscosity increase is at 0.5–0.6% chlorine additive.

The hydroxypropylation step is carried out in a medium which basically is a water miscible organic solvent. Many of the prior art alkylene oxide reactions were dry reactions. (See Tuschhoff U.S. Pat. No. 3,705,891 and Hanson U.S. Pat. No. 3,725,386). These dry reactions have the disadvantage that the starch reaction product must be further purified to remove a highly substituted starch fraction. In the present process, the reaction product is recovered by centrifugation, washed, and dried without a complex purification procedure.

In a preferred hydropropylation procedure, isopropyl alcohol, sodium hydroxide and water are placed in a flask equipped with a stirrer and pressure gauge. A suitable substitute for isopropyl alcohol is any water miscible organic solvent. To the foregoing mixture are added the sodium hypochlorite inhibited starch and propylene oxide.

The reaction flask is sealed and the reaction is started by increasing the temperature in the water bath. The temperature is not critical. However, it must be at a high enough level to initiate the reaction. At temperatures below about 100° F., the reaction will proceed too slowly to be economically feasible. At temperatures in excess of 200° F., product recovery will be extremely difficult. Therefore, the reaction should be conducted at a temperature between about 100° F. and 200° F. After the pressure in the reaction flask has decreased, additional propylene oxide is then added, and the reaction is continued. At least 25% propylene oxide on a dry solids basis is added in two portions to the alkaline slurry.

After the reaction is complete, the reaction mixture in the flask is neutralized with acetic acid or equivalent. The resulting product is recovered by means of centrifugation.

The centrifuge cake is reslurried in aqueous isopropyl alcohol, and the washed product is recovered by means of centrifugation. The washed product is dried in a fluid bed dryer at about 215° F. for 1 to 2 hours. The dried material can then be pulverized to a granular form, preferably to a size capable of passing an 80 mesh screen. The hydroxypropyl content of the product is about 15% to 20%, based on the weight of the starch.

In another embodiment of the invention, the starch may be modified by reaction with chlorine gas, rather than sodium hypochlorite.

In this alternative procedure, dent corn starch is suspended in water to form a slurry. The slurry should contain about 20% to about 43% starch by weight. Chlorine gas is added to the stirred starch slurry below the surface until the pH reaches 1.5. The concentration of chlorine gas should not exceed about 1.0%, based on the weight of starch. Addition of too much chlorine will result in degradation of the starch and an excessive lowering of viscosity as previously discussed. The treatment of the starch slurry requires about 2 to about 2½ hours at room temperature (68° F. to 86° F.). The starch slurry is then adjusted to pH 6 with a weak base, preferably sodium carbonate. The starch is dewatered by centrifugation, and then dried to 10 to 15% moisture content. The recovered starch is inhibited rather than being depolymerized or degraded and has somewhat decreased solubility in water compared to the untreated starch.

About 10 parts of the dried chlorinated starch is suspended in 10 parts of 90% aqueous isopropyl alcohol or another water miscible organic solvent. About 0.6 parts sodium hydroxide and 1.8 to 2.5 parts propylene oxide are added. All parts are on a weight basis. The resulting slurry is reacted at a temperature of about 100° F. to about 200° F.

The starch is cooled to about 85° F. and 0.5 parts of acetic acid is added to neutralize the solution. The neutralized starch is collected by means of centrifugation. The starch cake is resuspended in 86% aqueous isopropyl alcohol and recentrifuged. The starch cake is dried in an air oven for about 4 to about 5 hours at about 215° F. The dried material can then be ground to a granular form. It is preferred that 90% of the grains be capable of passing a 200 mesh screen. The starch has 15.5 to 18.5% hydroxypropyl content.

EXAMPLES I–V

A starch slurry was prepared by mixing 1 part dent corn starch with 1.4 parts water. The pH of the starch slurry was adjusted to about 3.0 with dilute hydrochloric acid.

Chlorine, as sodium hypochlorite solution, containing 8% active chlorine, was added to the starch slurry in amounts ranging from 0.5% to 0.7%, chlorine, based on the weight of starch. The reactions were conducted for 3 hours at a pH of 3.0. The reactions were conducted at 95° F. in all cases, except one. This reaction, in which the concentration of sodium hypochlorite was 0.5%, was conducted at 105° F. The pH was readjusted to 3.0 after the addition of sodium hypochlorite.

Three hours after the completion of the reaction, the unreacted sodium hypochlorite in the starch slurry was inactivated with sodium bisulfite. The starch slurry was then neutralized with a 2% aqueous sodium hydroxide solution.

The slurry was then washed with two volumes of water and filtered. The filtered cake was resuspended in water and filtered again. The washed starch derivative was then dried in an air oven to 12% moisture.

The following Table I shows Brabender viscosity values of the sodium hypochlorite inhibited starches:

TABLE I

| Example | % Chlorine as NaOCl | Reaction Time Hrs. | Reaction Temp. °F. | pH | Gel. Temp. °C. | Max. BU | 92.5° C. Hold BU | Controlled Cooling to 25° C. (Bu) |
|---|---|---|---|---|---|---|---|---|
| I   | 0   | —  | —   | — | 82   | 300 | 290 | 610 |
| II  | 0.5 | 3  | 95  | 3 | 73   | 380 | 360 | 710 |
| III | 0.5 | 3  | 105 | 3 | 73.5 | 350 | 400 | 700 |
| IV  | 0.6 | 3  | 95  | 3 | 73   | 320 | 330 | 500 |
| V   | 0.7 | 3  | 95  | 3 | 72   | 310 | 330 | 550 |

EXAMPLE VI

Three lb. of 100% isopropyl alcohol, 0.18 lb. of 50% sodium hydroxide, and 0.3 lb. of water were placed in a 5-liter three necked flask equipped with a mechanical stirrer and pressure gauge. Three lb. of sodium hypochlorite inhibited starch and 0.35 lb. of propylene oxide were added to the foregoing mixture. The flask was sealed, and the reaction was started by increasing the temperature to 130° F. After 24 hours of reaction, the pressure in the flask decreased. Another 0.35 lb. of propylene oxide was added. The reaction was continued for another 24 hours at this (130° F.) temperature.

After 48 hours, the reaction mixture in the flask was neutralized with 0.15 lb. of acetic acid. The product was recovered by centrifugation.

The starch product was reslurried in 3 lb. of 86% aqueous isopropyl alcohol, and the washed product was recovered by centrifugation. The product was dried in a fluid bed dryer for two hours at 215° F. The dried product was then milled to a size so that 90% was capable of passing a 200 mesh screen (U.S.S.). The hydroxypropyl content of the product was 17.4%.

EXAMPLE VII 1.7 lb. of inhibited dent starch (0.65% chlorine as sodium hypochlorite inhibited) was reslurried in 1.87 lb. of 90% aqueous isopropyl alcohol. 0.102 lb. of 50% sodium hydroxide was added to the solution. The starch was then hydroxypropylated under a low pressure with a slight excess of propylene oxide (27–28% on a dry solids basis) for 70 hours at 130° F. The propylene oxide was added in three portions to avoid high pressure in the system.

The reaction mixture was neutralized with 0.085 lb. of acetic acid. The product was then recovered by centrifugation. The cake was resuspended in 86% aqueous isopropyl alcohol, recentrifuged, and then dried in a fluid bed dryer for 2 hours at 215° F. The hydroxypropyl content of the product was 18.8%.

EXAMPLE VIII

Thirty pounds of dent corn starch were suspended in 40 lb. water. Chlorine gas was added below the surface of the slurry through a gas dispersion tube until the slurry was at pH 1.5. This step required 0.16 lb. chlorine or 0.6% chlorine on a dry solids basis. The starch was treated for 2 hours at 77° F. At the end of this time the pH of the starch slurry was adjusted to 6 with sodium carbonate. The starch was dewatered by centrifugation and dried to 13.7% moisture. Twenty lb. of the above dry inhibited starch was suspended in 20 lb. of 90% aqueous isopropyl alcohol containing 1.2 lb. 50% aqueous sodium hydroxide. 4.32 lb. propylene oxide were then added. The reactor was pressurized with 15 P.S.I. nitrogen gas and the reaction was started by heating the reaction mixture to 176° F. under agitation. The slurry was reacted at pressure of about 35 P.S.I. at 176° F. for 5 hours. At the end of this time the starch suspension was cooled to 85° F. and 1 lb. acetic acid was added to neutralize the slurry. The neutralized starch derivative was collected by centrifugation. The starch cake was resuspended in 20 lb. 85% aqueous isopropyl alcohol, recentrifuged, and the starch cake was dried in an air oven for 4½ hours at 215° F. The dried material was then ground to a size so that 90% was capable of passing a 200 mesh screen.

The following table shows Brabender viscosity of cold water hydrating starch in the presence of sucrose. Table II shows higher viscosity at 0.5 to 0.6% chlorine and reduced viscosity at greater or lesser figures.

TABLE II

| Example | % Chlorine as NaOCl | % Hydroxypropylation | 10 min. hold at 25° C. BU) | 45.5 min. heating cycle (BU) | 15 min. hold at 92.5° C. (BU) | Controlled cooling to 25° C. (Bu) |
|---|---|---|---|---|---|---|
| VI | 0.5 | 17.4 | 1200 | 350 | 340 | 1000 |
| VII | 0.65 | 18.8 | 550 | 200 | 195 | 530 |
| VIII | 0.6* | 17.1 | 860 | 230 | 220 | 850 |
| Hydroxypropylated starch (not inhibited) | 0 | 16.7 | 470 | 105 | 95 | 500 |
| Inhibited cold water hydrating starch | 0.5 | 16.0 | 800 | 225 | 220 | 810 |

*In this example, 0.6% chlorine gas (Cl$_2$) was used, rather than NaOCl.
In each example, 25 g cold water hydrating starch were cooked with 25 g sucrose and 400 ml. water.

EXAMPLE IX

An instant milk shake formulation was prepared to determine whether a mixture containing a combination of cold water hydrating starch and pregelled hydroxypropylated starch could successfully imitate the texture of a milk shake.

The instant milk shake formulation is shown below:

| | |
|---|---|
| Sugar | 54 g |
| Corn syrup solids | 25 g |
| Cold water hydrating starch (inhibited with 0.5% chlorine as NaOCl; 16.8% hydroxypropyl content) | 10 g |
| Pregelled hydroxypropylated starch (made with 8% propylene oxide) | 8 g |
| Cocoa powder | 3 g |

The foregoing ingredients were dry blended and the resulting mixture was mixed with 4 to 5 parts of 2% cold milk. The milk shake product thus prepared exhibited a thick and smooth texture.

EXAMPLES X–XIII

Vanilla pudding formulations were prepared with various cold water hydrating starches. The pudding formulations were prepared by mixing the following ingredients:

| | |
|---|---|
| Vanilla base mix** | 19.5 g |
| Cold water hydrating starch | 4.5 g |
| 2% milk | 118.0 ml |

*The vanilla base mix contains sweeteners, salts, color and flavors.

The following table (Table III) shows Brookfield viscosity (as measured on a BL RVF viscometer on the 0–100 scale with bar B at 20 RPM) of vanilla puddings made with various cold water hydrating starches.

TABLE III

| Example | Chlorine Treatment | % Chlorine Added | Temperature of Chlorination | % Hydroxypropyl Added | VISCOSITY Brookfield Viscosity* (6 min. standing) | (26 min. standing) | Vanilla Flavor |
|---|---|---|---|---|---|---|---|
| X | Cl$_2$ | 0.6 | 70° F. | 17.1 | 26 | 76 | Very good |
| XI | NaOCl | 0.5 | 95° F. | 16.7 | 35 | 85 | good |
| XII | NaOCl | 0.5 | 105° F. | 17.1 | 23.15 | (37) 73.5 | good |
| XII | NaOCl | 0.65 | 95° F. | 16.5 | 36 | 76 | good |

*The Brookfield viscosity was measured on a RVF model with spindle bar B at 20 rpm on the 0–100 scale, using a Helipath stand.

What is claimed:

1. A process of preparing a cold water hydrating starch comprising the steps of:
   A. reacting an acidic aqueous starch slurry with a source of active chlorine in which the active chlorine is present in amount of from about 0.1 to about 1.0% based on weight of starch at a temperature and time sufficient to produce a cross-linked intermediate starch product which is not degraded or depolymerized and has decreased solubility,
   B. reacting the intermediate product with propylene oxide, and
   C. recovering a cold water hydrating hydroxypropyl starch product having about 15–20% hydroxypropyl content.

2. The process of claim 1 wherein the source of active chlorine is sodium hypochlorite.

3. The process of claim 1 wherein the source of active chlorine is chlorine gas.

4. The process of claim 1 wherein the starch is reacted with 0.4–0.6% active chlorine by weight based on the weight of starch.

5. The process of claim 1 wherein chlorine inhibited starch reaction product is reacted with the propylene oxide at a temperature ranging from about 100° F. to about 200° F.

6. A process for preparing a cold water hydrating hydroxypropyl starch comprising the steps of:
   A. reacting sodium hypochlorite in an amount to provide about 0.1% to about 1.0% active chlorine based on the weight of starch with an aqueous starch slurry at a pH of about 2.9 to about 3.1 and at a temperature and time sufficient to produce a cross-linked intermediate starch product which is not degraded or depolymerized and has decreased solubility,
   B. reacting said intermediate starch product with propylene oxide in the presence of an alkaline water miscible organic solvent at a temperature of about 100° F. to about 200° F., and
   C. recovering a cold water hydrating hydroxypropyl starch product having about 15% to about 20% hydroxypropyl content.

7. The process of claim 6 wherein the aqueous starch slurry contains 20% to 43% starch by weight.

8. The process of claim 4 wherein the intermediate starch product is neutralized, washed, and dried prior to the reaction with propylene oxide.

9. A process for preparing a cold water hydrating starch comprising the steps of:
   A. adding from about 0.1% to about 1% active chlorine to an acidic aqueous starch slurry at a temperature and time sufficient to produce a cross-linked intermediate starch product which is not degraded or depolymerized and has decreased solubility,
   B. combining said intermediate starch product and propylene oxide in the presence of an alkaline water miscible organic solvent, and
   C. recovering a cold water hydrating hydroxypropyl starch product having about 15% to about 20% hydroxypropyl content.

10. The process of claim 9 wherein said starch slurry contains about 20% to about 43% starch, based on the weight of the slurry.

11. The process of claim 9 including the steps of adjusting the pH of the intermediate starch product to about 6, and dewatering the said starch product to a level of 10% to 15% water prior to the mixing of the intermediate starch product and propylene oxide in an alkaline isopropyl alcohol solution.

12. The process of claim 9 wherein each part by weight of starch is reacted with about 0.18 to 0.25 parts propylene oxide in a solution consisting of at least 0.005 parts alkali dissolved in at least 1 part isoproyl alcohol.

13. A cold water swelling starch product comprising the reaction product of an intermediate cross-linked chlorine modified starch product which is not degraded or depolyermized and has decreased solubility and propylene oxide, said starch having about 15% to about 20% hydroxypropyl content.

14. In a food product which contains starch and substantially all the desired recipe solids to prepare a directly consumable food product upon hydration of the food product with water, the improvement which comprises a food product which will be thickened by a cold water swelling starch, said starch being the reaction product of a cross-linked intermediate starch product containing 0.1% to 1.0% chlorine which was not degraded or depolymerized and had decreased solubility and propylene oxide, said starch having a degree of substitution (D.S.) of 15% to 20% hydroxypropyl content, wherein said starch, when hydrated with water, produces a short creamy textured paste.

15. The product of claim 15 wherein the intermediate starch product was treated with 0.1–1% chlorine as sodium hypochlorite.

16. The cold water swelling starch of claim 15 having a viscosity of at least 400 Brabender units at 10 minutes at 25° C., when 25 g of starch are cooked with 25 g sucrose and 400 ml water.

* * * * *